United States Patent Office 3,461,930
Patented Aug. 19, 1969

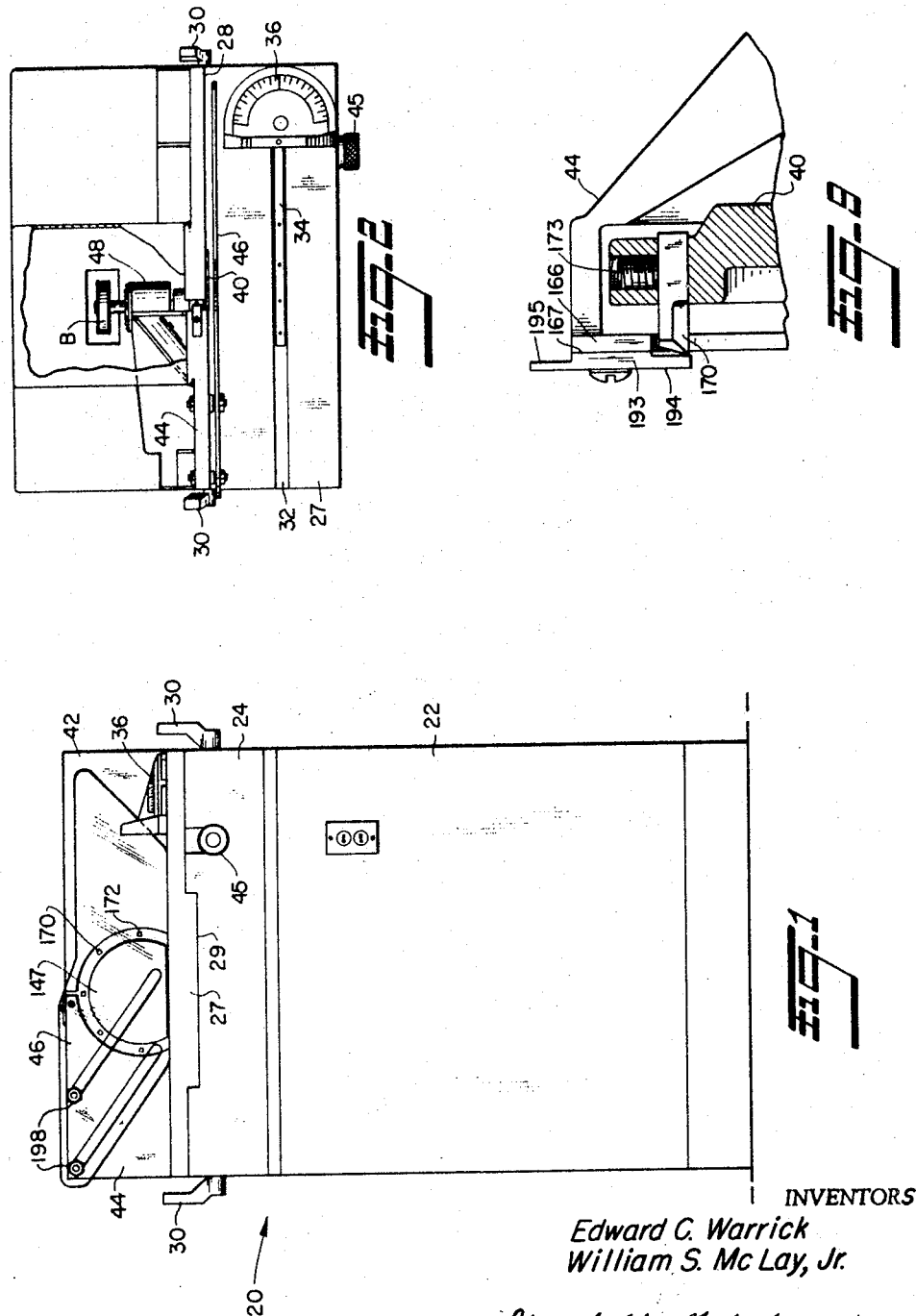

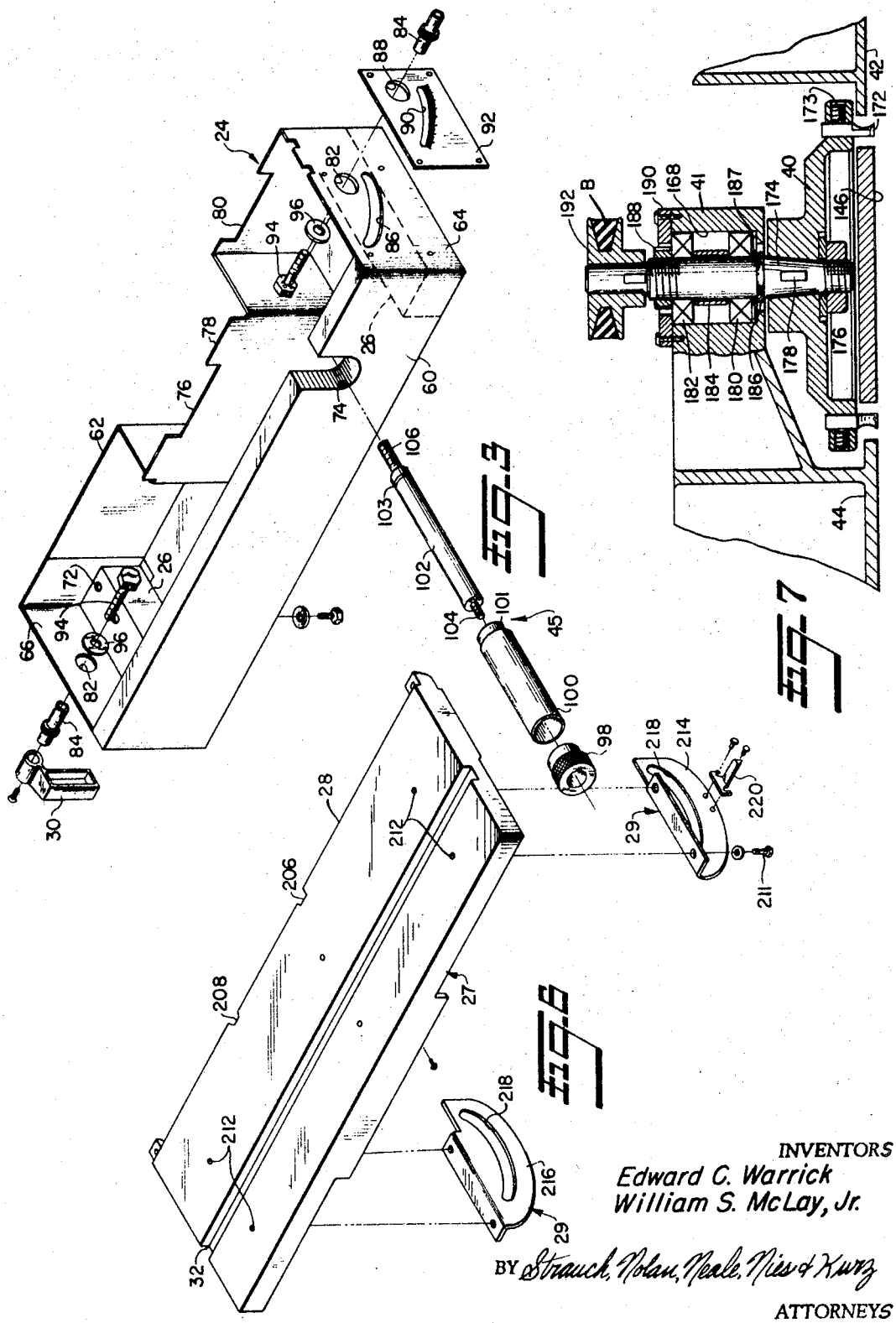

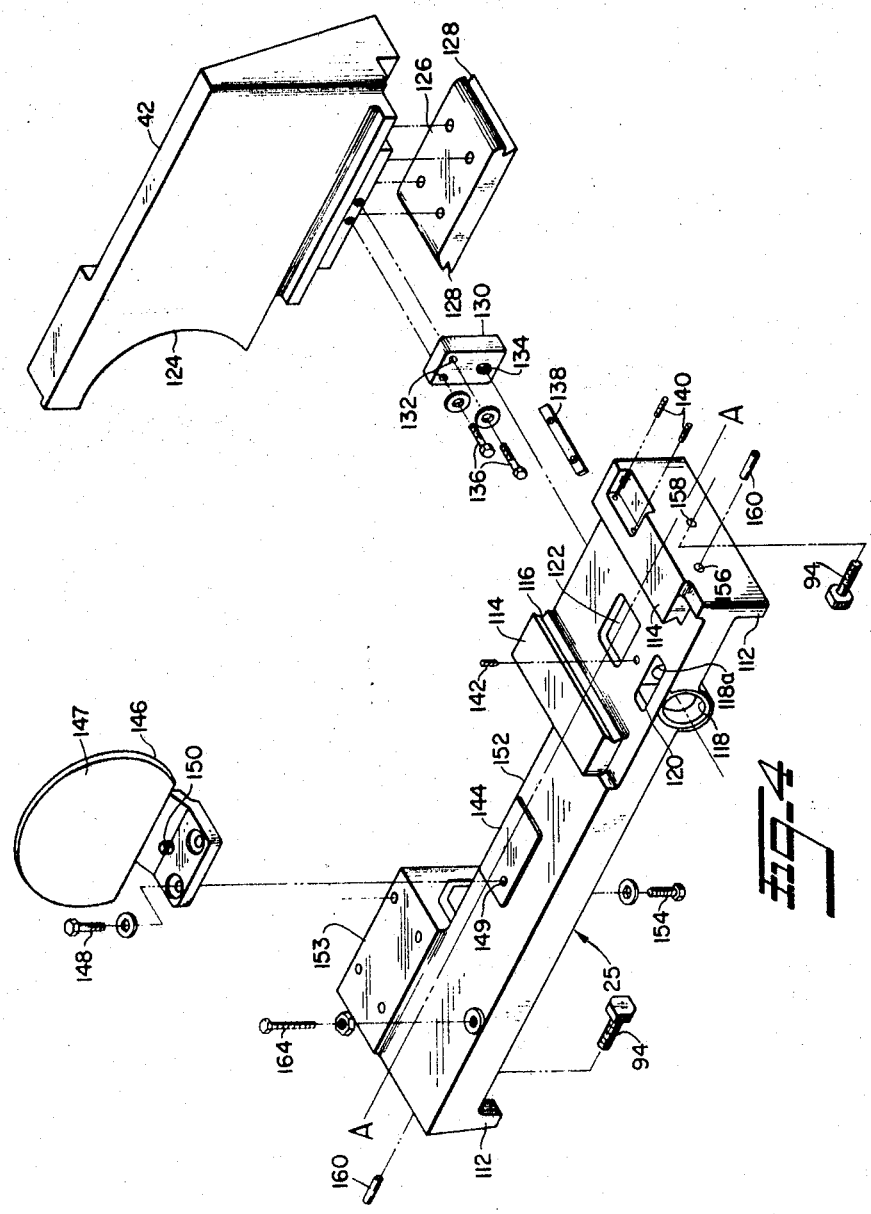

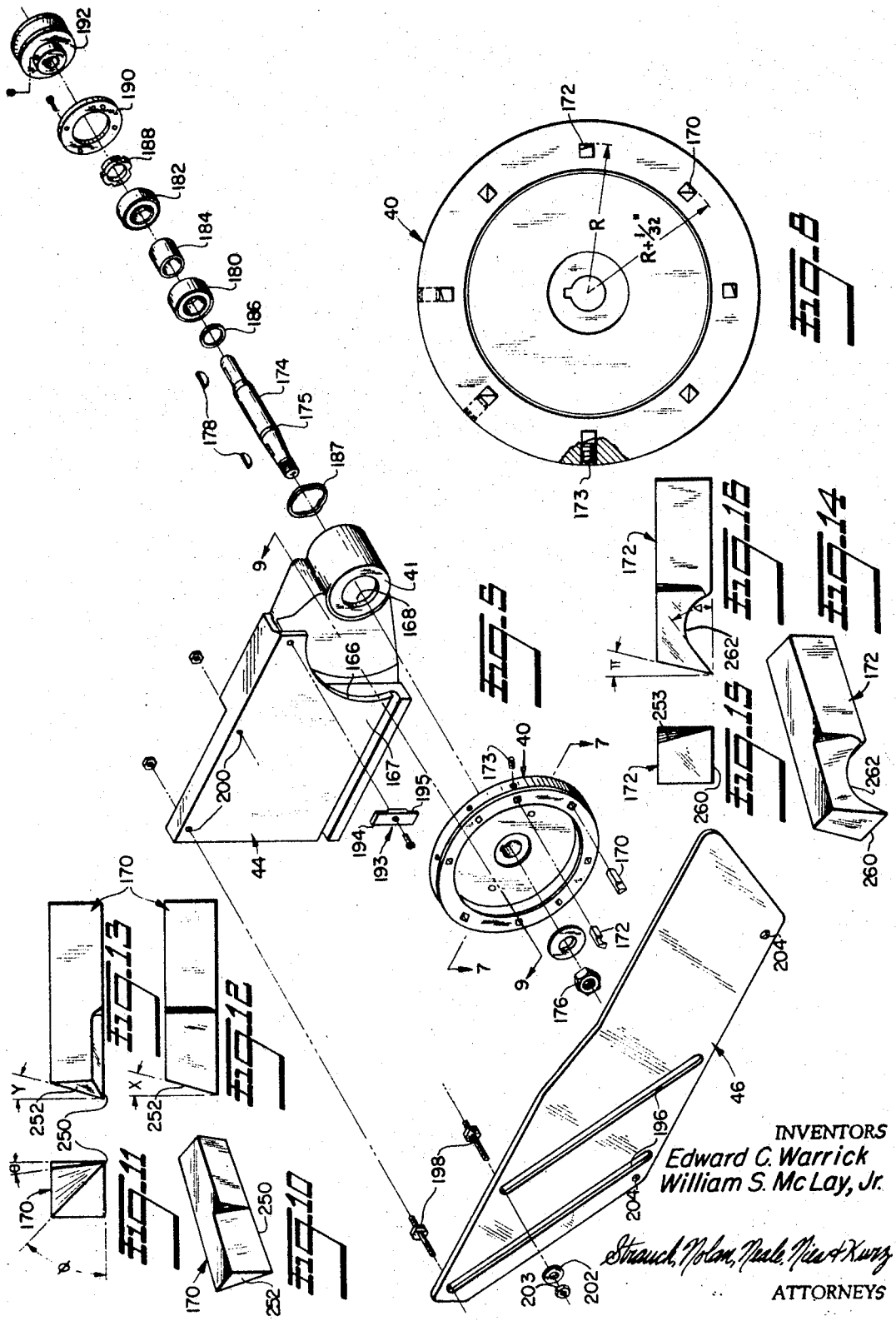

3,461,930
PLANING AND JOINTING MACHINE
Edward C. Warrick, Pittsburgh, and William S. McLay, Jr., Murrysville, Pa., assignors to Rockwell Manufacturing Company, Pittsburgh, Pa., a corporation of Pennsylvania
Filed Sept. 13, 1967, Ser. No. 667,466
Int. Cl. B27c 1/12; B27g 21/00
U.S. Cl. 144—118                    11 Claims

ABSTRACT OF THE DISCLOSURE

A machine for planing and jointing material in a single operation. A main bed plate supporting a cutting wheel, work guide fences, and work table accurately aligned by factory assemblage to produce a stable, accurate, and lasting machine. Roughing and finishing cutters are alternately arranged around the cutting wheel and a critical relationship is maintained between the setting of the cutters, and between the cutter setting and the plane of the outfeed fence. The axis of rotation of the wheel is perpendicular to and to one side of the direction of travel of the workpiece fed by hand along the table past the wheel and against the fence to permit the cutters to safely operate at one side of the operator's hands cutting when moving downwardly and upwardly. A stable adjustment device for the infeed fence permits accurate variance and maintenance of the depth of cut.

Background of the invention

This invention relates to a cutting machine, and more particularly to a planing and jointing machine providing a smooth, truly planar surface on material, such as wood, adapting it to receive a high surface finish or form a true jointed fit with a mating planed workpiece.

Machines of this general type are known in the art. For example, U.S. Letters Patent 2,612,192 to Ryan discloses a device wherein a workpiece is hand fed along a table to engage a rotary cutter wheel having roughing and finishing cutters thereon. The wheel is angularly positioned with respect to the direction of travel of the workpiece to prevent functioning of the cutters on the workpiece during their upward movement. Additionally, infeed and outfeed fences are provided to guide the workpiece along the table with adjustment means on the infeed fence to vary the depth of cut.

Such prior art devices fail to produce the desired planar surface for several reasons. First, because the devices have not been very stable, it has been difficult to maintain accurately the relative alignment of the various parts during operation, thus resulting in finished workpieces which do not meet required specifications. Second, the particular arrangement of the cutter wheel has wasted available cutting energy and the relative angular presentation of the cutters have produced uneven surfaces. Third, the various type infeed fence adjustment mechanisms utilized have not performed satisfactorily to produce accurate control of the depth of cut in the workpiece.

Summary of the invention

A primary object of this invention is to plane and joint materials, such as wood, to render them truly planar, smooth and suitable for use with minimal finishing processing.

Another object of this invention is to provide a machine which has accurate, rigid and lasting qualities due to accurate factory assemblage of the various parts.

Another object of this invention is to provide a machine having roughing and finishing cutters alternately contacting the work during both downward and upward movement of the cutters and critically relatively adjusted to assure true planing.

Another object of this invention is to provide a machine whereby the depth of cut may be accurately varied and maintained to desired specifications.

Another object of this invention is to provide a guard means for a cutting machine of the type concerned to promote safety of operations and reduce physical injury.

Another object is to provide a cutting machine having cutting means journalled on a work guide fixedly connected to a support bed to insure continued proper alignment of the cutting means with respect to the work during operation of the machine.

Another object is to provide a machine having means to maintain a critical relationship between the respective setting of roughing and finishing cutters and between the cutters and the outfeed fence to produce a straight, smooth finished surface.

In summary, this invention overcomes the prior art disadvantages and accomplishes the above objects by providing a cutting machine having a fixed bed plate with a longitudinal axis. Mounted above the bed along the axis is an angularly adjustable table which supports the work to be cut.

A guide fence at the material infeed end is laterally adjustably mounted on the bed to vary the depth of cut on the work and a guide fence at the outfeed end is fixedly mounted on the bed. The outfeed fence has an arm forming a journal housing within which is supported a rotating cutting wheel, for rotation in the longitudinal plane of the outfeed fence workpiece engaging face. Removably mounted on the wheel are a plurality of roughing and finishing cutters alternately spaced around the wheel and having their cutting edges arranged parallel to the longitudinal plane of the outfeed fence guide face and the direction of movement of the work. Because the axis of rotation of the wheel is perpendicular to this longitudinal plane, the cutters function to cut the work when moving both downwardly and upwardly by rotation of the wheel. A critical relationship is maintained between the respective settings of the rough and finish cutters to produce a smooth, straight cut in the workpiece. A guard plate for the cutter is slidably mounted on the outfeed fence and is maintained out of contact with the cutter by spacers which contact the infeed and outfeed fences. A cutting wheel cover plate shielding the operator from the rotating wheel is mounted in the plane of the outfeed table.

Brief description of the drawing

FIGURE 1 is a front elevation view of the planing machine of the invention;

FIGURE 2 is a top plan view of the machine of FIGURE 1;

FIGURE 3 is an exploded view showing the base housing and adjustment screw means for the infeed fence;

FIGURE 4 is an exploded view of the bed, infeed fence, and the center wheel guard;

FIGURE 5 is an exploded view of the outfeed fence, cutter wheel, and cutter guard;

FIGURE 6 is an exploded view of the table and its support trunnions;

FIGURE 7 is a sectional view along line 7—7 of FIGURE 5;

FIGURE 8 is a front elevation view, partially in section, of the cutter wheel showing the mounting and arrangement of the cutters;

FIGURE 9 is a partial section view along line 9—9 of FIGURE 5 showing the setting gauge arrangement for setting the cutters;

FIGURE 10 is a perspective view of the roughing cutter of the invention;

FIGURE 11 is a front elevation view of the cutter of FIGURE 10;

FIGURE 12 is a side elevation view of the cutter of FIGURE 10;

FIGURE 13 is a top plan view of the cutter of FIGURE 10;

FIGURE 14 is a perspective view of the finishing cutter of the invention;

FIGURE 15 is a front elevation view of the cutter of FIGURE 14;

FIGURE 16 is a side elevation view of the cutter of FIGURE 14.

Description of the preferred embodiment

Referring to FIGURES 1 and 2, the planing machine 20 comprises a support stand 22 resting on a suitable foundation, such as the floor, a supporting housing 24 (FIGURE 3) rigidly secured to the upper open end of stand 22 and composed of a heavy gauge front wall, sheet metal end walls and a sheet metal back wall having a portion intermediate its ends offset toward the front wall, a bed plate 25 (FIGURE 4) shaped to telescope into the upper end of housing 24 with its opposite dependent ends resting on angle plates 26 welded in the lower ends of housing 24, a table 27 pivotally adjustably mounted on the ends of bed 25 for raising or lowering movement about its rear longitudinal upper edge 28 by trunnion assemblies 29 including locking devices 30 to hold table 27 in a desired angular position, an infeed fence 42 extending rearwardly along table edge 28 and laterally slidably mounted at one end of bed 25, an outfeed fence 44 extending forwardly along table edge 28 and fixedly mounted at the other end of bed 25, a cutter wheel 40 journalled in an integral forwardly directed journal arm 41 of outfeed fence 44 for rotation in a vertical plane between the inner ends of infeed fence 42 and outfeed fence 44 adjacent table edge 28 in the offset portion of the back wall of housing 24.

Table 27 is provided with a mitre gauge groove 32 in which slide rod 34 of mitre gauge 36 slides during operation. Mitre gauge 36 is used to vary the angle at which the workpiece is fed along the top face of table 27 when it is desired to form a longitudinally tapered planed surface on a workpiece.

The adjacently related ends of infeed fence 42 and outfeed fence 44 are arcuately shaped to peripherally enclose cutter wheel 40 above table edge 28. An infeed fence adjust screw assembly 45 is provided for laterally shifting infeed fence 42 with respect to table 27 to vary the depth of cut on the work. Guard 46 for cutter 40 is slidably connected to outfeed fence 44. Motor 48 for driving wheel 40 by a conventional pulley drive is mounted within housing 22.

Referring to FIGURE 3, housing 24 comprises a front wall 60, rear wall 62, and end walls 64 and 66. Angle plates 26 having openings 72 are welded to end walls 64, 66 and front and rear walls 60, 62. Front wall 60 has a slot 74 through which adjustment device 45 extends. Rear wall 62 has a forwardly offset section 76 with upstanding flanges 78 and also has a slot 80 located generally opposite slot 74 in front wall 60. End walls 64 and 66 have openings 82 through which axially tapped table locking trunnion shafts 84 extend. The opening 82 and arcuate slot 86 of end wall 64 align with opening 88 and slot 90 of table angle indicator plate 92, which is mounted on the end wall. Trunnion locking shafts 84 cooperate with bolts 94 and washers 96 to clamp table trunnions 214 and 216 and hold table 27 in a fixed angular position. Levers 30 (one only being shown) are connected to shaft 84 for threading bolts in and out to lock and unlock the trunnions 214 and 216.

The infeed fence adjustment mechanism 45 includes a knob 98 having a reduced diameter end journalled in the outer end of a sleeve 100 extending through aperture 74 of housing 24 and having a reduced end portion 101 press fitted into apertures 118 of bed 25, and a shaft 102 having groove 103 adjacent its inner end to receive set screw 142 threaded into bed 25 to fix shaft 102 against axial movement with respect to sleeve 100 and threaded ends 104 and 106. Shaft 102 extends through tubing 100 and through aperture 118a and connects to knob 98 by threaded end 104.

As best shown in FIGURE 4, bed 25 has downwardly extending bed supports 112, which rest on angle plates 26 in housing 24. Raised guide ways 114 having opposed grooves 116 extend laterally across bed 110, perpendicular to the longitudinal axis A—A defining the direction of travel of the work. Apertures 118, 118a are located between and below guide ways 114 on a common axis extending in a direction parallel to the ways and grooves. Openings 120 and 122 open downwardly through bed 110 along this common axis.

Infeed fence 42 has arcuate end 124 and a dovetail plate 126 is adjustably bolted to its bottom. Plate 126 has tongues 128 which engage grooves 116 to permit accurate and stable alignment and lateral movement of fence 42 with respect to bed 110. A block 130 is rigidly connected to the lower edge of fence 42 in dependent relation by bolts 136 passing through openings 132 and has a threaded opening 134. Block 130 extends downwardly into bed opening 122 and its opening 134 threadedly receives end 106 of shaft 102 of adjustment mechanism 45. Fence 42 is adjusted for free axial sliding movement along ways 114 by jib key 138, which is adjusted to engage tongue 128 through set screws 140 in well known manner.

Located on bed 110 midway of notch 152 receiving offset section of housing wall 62 is mounting pad 144 on which the cutting wheel cover plate 146 having an inner face 147 is secured by bolt and washer assembly 148 threaded into an accurately located tapped aperture 149 in pad 144 to relate the back edge of plate 146 to the face of outfeed fence 44. Set screw 150 serves as a horizontal adjustment device to accurately position plate 146 so its face will lie in the plane of the outfeed fence face.

Pad 153 of bed 110 serves as a mounting base for the outfeed fence 44, which is fixedly secured to the bed by four bolts 154, one only being illustrated.

On each of the support legs 112 are openings 156 and 158, the latter being vertically lower than the former. A trunnion support pin 160 is threadedly connected to opening 156. Bolts 94 pass freely outwardly through openings 158 and are threaded into the table trunnion shafts 84 which cooperate with pins 60 and trunnions 29 to establish the path of movement of the trunnions 29.

A screw 164 threaded into bed 25 serves as an adjustable table stop to adjust the table 27 initially at a 90° angle to the fences 42 and 44.

Referring now to FIGURE 5, the outfeed fence 44 comprises an arcuate end 166, guide face 167, and journal arm 41 provided with a stepped bore 168 for rotatably supporting cutter wheel 40. Roughing cutters 170 and finishing cutters 172 are spaced alternately around wheel 40 with their cutting faces parallel to longitudinal axis A—A of bed 110, and thus, to the direction of travel of the work.

As seen in FIGURES 5 and 7, wheel 40 is secured to shaft 174 by threaded nut 176 and key 178. Shaft 174 rotates in journal bore 168 on bearings 180 and 182 separated by bushing 184. Seat ring 186 fits into annular recess 175 against thrust ring 187 and a locking nut 188 threaded on shaft 174 outwardly of bearing 182 fixedly mounts the bearings to shaft 174 for unitary insertion into bore 168. A cover plate 190 bolted to arm 41 engages the outer race of bearing 182 and when drawn down forces shaft 174 and its associated bearings axially along bore 168 to abut the outer race of bearing 180 against the shoulders of the stepped bore to preload the bearings assuring smooth operation. A pulley 192 keyed to shaft 174 by key 178 is connected to motor 48 by a U-belt B to drive shaft 174 and cutting wheel 40 about an axis perpendicular to axis A—A of bed 110.

As shown in FIGURES 5 and 9, a cutter setting gauge 193 adapted to be mounted on outfeed fence 44 at arcuate end 166 has upper portion 194 and lower portion 195 offset different distances from the work engaging face of fence 44 to gauge the proper setting of the respective cutters 170 and 172, which are secured to wheel 40 by radially directed set screws 173.

Also, slidably mounted on fence 44 is a Plexiglas cutter guard 46 which has rearwardly and upwardly angled slots 196. Double ended studs 198 threaded at one end into openings 200 of fence 44 freely journal rollers 202 on their respective oppositely directed shanks inwardly of retainer nuts 203 in position to engage slots 196 and permit vertical rearward angular movement of guard 46 with respect to the fences 42 and 44 and table 27. Round head spacer flanges on studs 198 and spacer screws 204 threaded through apertures adjacent the lower edge of guard 46 contact fences 42 and 44 to maintain guard 46 out of contact with cutter wheel 40.

Table 27 shown in FIGURE 6, has an inner edge corner 28 lying in the plane of the work engaging face of fence 44 about which it pivots due to the trunnion mounting on bed 25. Notches 206 and 208 provided along edge 28 allow passage of the cutters 170 and 172 during the cutting operation. Connected to the bottom of table 27 by suitable screws 211 threaded into apertures 212 are trunnions 214 and 216 of identical construction. When assembled, trunnions 214 and 216 are located between the bed supports 112 and housing walls 64 and 66, respectively. Arcuate slots 218 in trunnions 214 and 216 are dimensioned to receive bolts 94 and pins 160 to support the trunnions to permit tilting movement of table 27 around edge 28 as a center along a path defined by the arc of slot 218. Table locking trunnion shafts 84 threadedly receive bolts 94, and are threaded up by means of handles 30 to clamp trunnion assemblies 29 to the walls 112 of the bed plate 25, thus retaining the table in the desired angular relationship to the fences, Trunnion 216 has a pointer 220 bolted to it in position to extend through slots 86 and 90 of housing wall 64 and plate 92 to indicate the angle at which table 26 is set.

As has been mentioned and illustrated in FIGURES 5 and 8, the roughing cutters 170 and finishing cutters 172 are alternately arranged on cutter wheel 40. This provides an initial gouging action by the angled roughing blades 170 and a smoothing, shearing action by the finishing blades 172 to result in a superior finished planar surface when adjusted as will now be described. The openings for the cutters in wheel 40 are alternately at different radial distances from the axis of rotation of the wheel, the roughing cutter recesses being at a radius ½₂ inch greater than the finishing cutter recesses. In addition, the cutters are set to extend different distances axially beyond the plane of the outfeed fence 167. This is accomplished by using gauge 193. As best shown in FIGURE 9, gauge 193 is fixed in position on the outfeed fence 167 so that an end of the gauge overlies the path of travel of the cutters, at the point where the corresponding set screw 173 is accessible. End 194 of gauge 193 is ground to allow .003 inch extension outwardly from the outfeed fence guide face 167. Similarly, by means of end 195 the finish cutters can be set to extend .007 inch beyond the plane of the outfeed fence. After setting these cutters, the finishing cutters are honed to insure that all the finishing cutters project the same amount, to obtain a smooth finish. Thus, in operation, the roughing cutters 170 make first contact with the work, being at a greater radius than the finishing cutters. These roughing cutters remove varying amounts of stock, depending on the depth of cut set on the infeed fence. The finishing cutters 172, being at a smaller radius, contact the work at a point slightly farther along the path of travel of the work, and remove a much smaller amount of material. Because these finishing cutters 172 are set out further axially than the roughing cutters 170, the second contact of these cutters with the work is only made by the finishing cutters. This second contact is made on the upstroke of wheel 80 (the side nearest the outfeed fence).

By setting the cutters beyond the plane of the outfeed fence 167, it would appear that other than a planar surface would result. This is not the case. A considerable amount of experiment showed that if the settings mentioned above were exceeded, a concave surface is formed on the finished face of the workpiece, and if the settings were less than those recommended above, a convex surface resulted. However, when these settings are adhered to, a smooth straight and truly planar surface results.

Another item of interest discovered during the experiments was, that if one of the softer grades of wood was being worked, the roughing cutters could be dispensed with. However, when harder woods were worked, the roughing cutters were necessary to insure longer finishing cutter life.

A roughing cutter particularly suitable for use with the invention is illustrated in FIGURES 10–13. The cutter 170 is ground from rectangular bar stock to provide a cutting edge 250 with a clearance angle $\theta$ of 5° and a rake angle $\phi$ of 45°. The face 252 slopes upwardly and rearwardly at angles X and Y of 15°.

Illustrated in FIGURES 14–16 is a finishing cutter suitable for use in the invention. The cutter 172, which is also ground from rectangular bar stock, has a cutting edge 260 with a clearance angle of 15° and a rake angle of 35°. The cutter also has a groove 262 to facilitate removal of chips from the workpiece and the face 253 slopes upwardly and rearwardly at an angle of 25°.

The orientation of the cutters as seen in FIGURES 10–16 represent their position as they contact the workpiece and perform their cutting operation.

The above described planer and jointer has found wide acceptance in the woodworking industry in which the existence of a commercial device of its type has been noticeably absent. Because of the stability and accuracy characteristics, the achievement of planing results comparable to commercial prior art planers and jointers, the critical cutter adjustment necessary in prior art devices, and the safety precautions built into the machine of the present invention, it has created extreme interest among manual training teachers and hobbyists, trade school students, semi-skilled operators, etc., in addition to woodworking specialists.

In past commercial planers and jointers the planing cutting wheel was situated crosswise in an opening at the center of the work table. The hands of the operator feeding the work to the cutting wheel pass directly over the wheel applying forward and downward feed pressure to the workpiece. All too frequently, a dangling finger or a kickback of the workpiece due to an easing of the feed pressure or too heavy a cut resulted in the fingers or hands entering the cutters and the loss of fingers or more serious injuries.

The arrangement of the elements of this invention eliminates this dangerous condition, since the operator's hands feeding the work pass over an uninterrupted feed table to one side of the cutter wheel which is additionally at all times covered either by the movable guard alone or the movable guard and workpiece and the feed pressure applied downwardly and crosswise at a point remote from the cutting wheel, will cause the hands to engage the work table in event of kickbacks and dangling fingers will be nowhere near the cutting wheel. Furthermore, the major cutting force exerted by the cutters is downward forcing the work against the solid, stable table eliminating the chance of a kickback of the workpiece as in the conventional prior art planers and jointers where the full cutting forces are required to be overcome by the downward and forward feed pressure of the operators hands. Additionally, these cutters do not draw the operators fingers in to the cutting area, as is the case with prior art jointers. In the unlikely event that a finger should come in contact with a cutter of the planer and jointer of the instant invention, a nick in the finger would result, but no "drawing in" force is exerted to greatly increase the damage as is the case with prior art devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A planer and jointer comprising:
   (a) an elongated bed plate having an infeed end and an outfeed end;
   (b) laterally directed guide ways on said bed plate at its infeed end;
   (c) infeed fence means mounted on said guide ways and extending along one longitudinal edge of said bed plate at the infeed end of said bed plate for lateral adjusting movement with respect to guide ways and said one edge;
   (d) outfeed fence means fixedly mounted to said outfeed end of said bed plate and extending along said one longitudinal edge of said bed plate at the outfeed end of said bed plate and formed at its inner end with a longitudinally directed support arm offset laterally back from its workpiece engaging face and providing a laterally directed journal bore disposed between the adjacently related ends of said infeed and outfeed fences;
   (e) table means mounted in superposed overlying relation to said bed plate for tilting movement around the upper corner adjacently related to the workpiece engaging face of said outfeed fence means;
   (f) a rotary cutter wheel journalled in said journal bore for rotation between said adjacently related ends of said infeed and outfeed fences and parallel to the longitudinal plane of the outfeed fence workpiece engaging face; and
   (g) adjustment means for shifting said infeed fence between a position where its workpiece engaging face lies in the longitudinal plane of the outfeed fence workpiece engaging face to a position offset rearwardly from said plane to establish a depth of cut adjustment for said rotary cutter wheel.

2. The planer and jointer of claim 1, wherein said guide means includes grooved passageways; said infeed fence includes a dovetail plate which extends into said grooves; and said adjustment means comprises a drive shaft which extends through said bed plate and connects to said dovetail plate to move said infeed fence laterally with respect to said bed plate and table.

3. The planer and jointer of claim 1, wherein a plurality of roughing and finishing cutters are alternately spaced about said wheel, each of said cutters having a cutting edge lying substantially in said longitudinal plane during the entire rotation of said wheel, whereby said cutters function on both the downward and upward movement thereof.

4. The planer and jointer of claim 3, wherein a differential setting is maintained between said roughing and finishing cutters to establish a finishing cut.

5. The planer and jointer of claim 4, wherein said differential setting is on the order of .002 inch.

6. The planer and jointer of claim 1, including guard means for said cutter wheel slidably mounted on said outfeed fence means and having spacer means contacting said infeed and outfeed fence means to maintain said guard out of contact with said wheel.

7. A planer and jointer comprising:
   (a) a table having infeed and outfeed ends;
   (b) an infeed fence located at said table infeed end;
   (c) an outfeed fence at said table outfeed end;
   (d) a rotating cutter wheel mounted adjacent said table between said fences, cutter means mounted on said cutter wheel having cutting edges lying substantially in the longitudinal plane of the outfeed fence work engaging face during the entire rotation of said wheel;
   (e) center guard means having a work engaging face lying substantially in said longitudinal plane thereby providing a guide for a workpiece and a shield for the rotating cutter wheel; and
   (f) guard means for said cutter wheel slidably mounted on said outfeed fence for vertical movement to pass a workpiece therebelow and having spacer means contacting said infeed and outfeed fences to maintain said guard means out of contact with said cutter.

8. A planer and jointer comprising:
   (a) a table having infeed and outfeed ends;
   (b) an outfeed fence having a workpiece guide face and located at said table outfeed end;
   (c) a rotating cutter wheel mounted adjacent said table for rotation substantially parallel to the longitudinal plane of said outfeed fence guide face; and
   (d) a plurality of roughing and finishing cutters alternately spaced around said cutter wheel and having cutting edges lying substantially in said longitudinal plane during the entire rotation of said wheel, said roughing and finishing cutting edges being set at a differential of .002 inches, which is the depth of cut of said finishing cutters.

9. The planer and jointer of claim 8, wherein said roughing cutters are set to extend outwardly from said guide face a distance of .003 inch and said finishing cutters a distance of .005 inch during operation.

10. The planer and jointer of claim 8, wherein said roughing and finishing cutters being alternately spaced around said cutter wheel and being set at different radial distances from the axis of rotation of the cutter wheel.

11. The planer and jointer of claim 10, wherein said roughing cutters describe an arc 1/32" greater in radius than said finishing cutters.

References Cited

UNITED STATES PATENTS 2,612,192  9/1952  Ryan _____ 144—118 X

ANDREW R. JUHASZ, Primary Examiner

G. WEIDENFELD, Assistant Examiner

U.S. Cl. X.R.

144—117, 134, 251